(12) United States Patent
Ko

(10) Patent No.: US 11,997,061 B2
(45) Date of Patent: May 28, 2024

(54) METHOD FOR PROVIDING MUTUAL-LIKING-BASED CHAT SERVICE

(71) Applicant: Young Hyun Ko, Jeonju-si (KR)

(72) Inventor: Young Hyun Ko, Jeonju-si (KR)

( * ) Notice: Subject to any disclaimer, the term of this patent is extended or adjusted under 35 U.S.C. 154(b) by 0 days.

(21) Appl. No.: 18/248,058

(22) PCT Filed: Jun. 1, 2021

(86) PCT No.: PCT/KR2021/006775
§ 371 (c)(1),
(2) Date: Apr. 6, 2023

(87) PCT Pub. No.: WO2022/075548
PCT Pub. Date: Apr. 14, 2022

(65) Prior Publication Data
US 2023/0291699 A1    Sep. 14, 2023

(30) Foreign Application Priority Data

Oct. 6, 2020  (KR) .................. 10-2020-0128511

(51) Int. Cl.
*H04L 51/046*   (2022.01)

(52) U.S. Cl.
CPC ......................... *H04L 51/046* (2013.01)

(58) Field of Classification Search
CPC ..................................................... H04L 51/046
See application file for complete search history.

(56) References Cited

U.S. PATENT DOCUMENTS

2018/0262717 A1* 9/2018 Imaoka ................... G06Q 50/10
2020/0351234 A1* 11/2020 Gaon ...................... H04L 51/52

FOREIGN PATENT DOCUMENTS

| KR | 10-2015-0006916 A | 1/2015 |
| KR | 10-2015-0112142 A | 10/2015 |
| KR | 10-1852117 B1 | 4/2018 |

\* cited by examiner

*Primary Examiner* — Jason D Recek

(57) ABSTRACT

A method for providing a mutual-liking-based chat service is disclosed. A method by which a server provides a chat service, according to an embodiment of the present invention, may comprise the steps of: receiving mutual liking scores between users from user terminals; calculating a summed score for each of other users by summing a liking score which a first user has assigned to each of the other users and a liking score assigned from each of the other users, if a special chat room opening request of the first user among the users is received; selecting a second user corresponding to the highest score from among the summed scores; and opening a special chat room between the first user and the second user.

3 Claims, 4 Drawing Sheets

METHOD FOR PROVIDING MUTUAL-LIKING-BASED CHAT SERVICE

TECHNICAL FIELD

The present disclosure relates to a method for providing a chat service and, more particularly, to a method for providing a chat service capable of reducing the burden of displaying likeability by opening a special chat room on the basis of mutual liking.

BACKGROUND ART

Chatting is the act of exchanging text messages in real time between two or more users on a network. Chatting is a method that users enjoy using since PC communications, and there is a method in which a user enters a chat room and has conversations. Recently, with the development of the internet and webcams, new technologies such as voice chatting, and video chatting have become widespread. In addition, a simple instant messenger that does not use a chat room is widely used.

Recently, various types of chat services have been provided. Chatting between acquaintances is basic, and various chat services such as open chatting that an unspecified number of people can participate in and secret chatting that prevents conversations from being leaked to the outside world are being developed and serviced.

In addition, services such as random chatting, which randomly connects the other party, and user-customized chatting, which analyzes a user's preferences, conditions, or the like, and selects and connects the other party, have also appeared.

Although various chat services are being developed and serviced, most of the chat services that have appeared recently are for instant meetings between people who do not know each other, and there is no service that connects acquaintances based on their liking.

DETAILED DESCRIPTION OF THE INVENTION

Technical Problem

A technical problem to be achieved by the present disclosure is to provide a chat service that can reduce the burden of expressing likeability by opening a special chat room based on mutual liking between acquaintances.

Problem Solving Means

A method of providing chat service according to the present disclosure may be performed by a server and include the steps of receiving mutual liking scores among users from user terminals, if a special chat room opening request of a first user among the users is received, calculating summed scores for each of other users by summing up liking scores assigned to each of the other users by the first user and liking scores assigned to the first user by each of the other users, selecting a second user corresponding to a highest score from among the summed scores, and opening a special chat room between the first user and the second user.

Herein, the method may further include the step of receiving, from the user terminals, individual special chat room opening rules set by the users, wherein the step of selecting a second user may include selecting the second user according to the individual special chat room opening rules when a plurality of users has the highest point.

The special chat room opening rules may be either one of self-oriented rules for selecting the second user according to the liking scores assigned to the other users by the first user and other-oriented rules for selecting the second user according to the liking scores assigned to the first user by the other users.

The liking scores may be composed of grades indicated by number of hearts.

Herein, if only one type of mutual hearts is given to each other between the users, a special chat room is opened between the corresponding users, and if two or more types of mutual hearts are given to each other, opening of a special chat room may be controlled by classifying cases into a case where highest sums of mutual hearts given between corresponding users are the same and a case where the highest sums of the mutual hearts given between the corresponding users are different.

That is, if the highest sums of the mutual hearts are the same, opening of a special chat room is controlled by classifying cases into a case where terms that form largest sums are common (herein, the wording "terms" are a set consisting of number of hearts received by the users), a case where the terms that form the largest sums are different, and a case where the terms that form the largest sums are equal to each other, such that in the case where the terms that form the largest sums are common, a special chat room may be opened between a user who was selected most and a user to whom this user gave most hearts, in the case where the terms that form the largest sums are different, a special chat room may be opened between users with a largest product among the same sums, and in the case where the terms that form the largest sums are equal to each other, a special chat room may be opened between users who gave hearts first.

In addition, if the highest sums of mutual hearts given between users are different, a special chat room may be opened by calculating largest sums.

Meanwhile, if cases with same numbers of hearts occur due to changes in number of mutual hearts, opening of a special chat room is controlled by classifying cases into a case where number of hearts is decreased than before, a case where number of hearts is increased than before, and a case where a new heart is given, such that in the case where the number of hearts is decreased than before, a special chat room may be opened with a user who maintains hearts, not a user who reduced hearts, and in the cases where the number of hearts is increased than before and where a new heart is given, a special chat room may be opened with a user whose number of hearts was changed later.

Effect of the Disclosure

The method for providing a chat service according to an embodiment of the present disclosure can reduce the burden of expressing likeability by opening a special chat room based on mutual liking between acquaintances.

BRIEF DESCRIPTION OF DRAWINGS

In order to more completely understand the drawings referred to in the detailed description of the present disclosure, a detailed description of each of the drawings is provided.

BEST MODE FOR CARRYING OUT THE INVENTION

Figure 1:
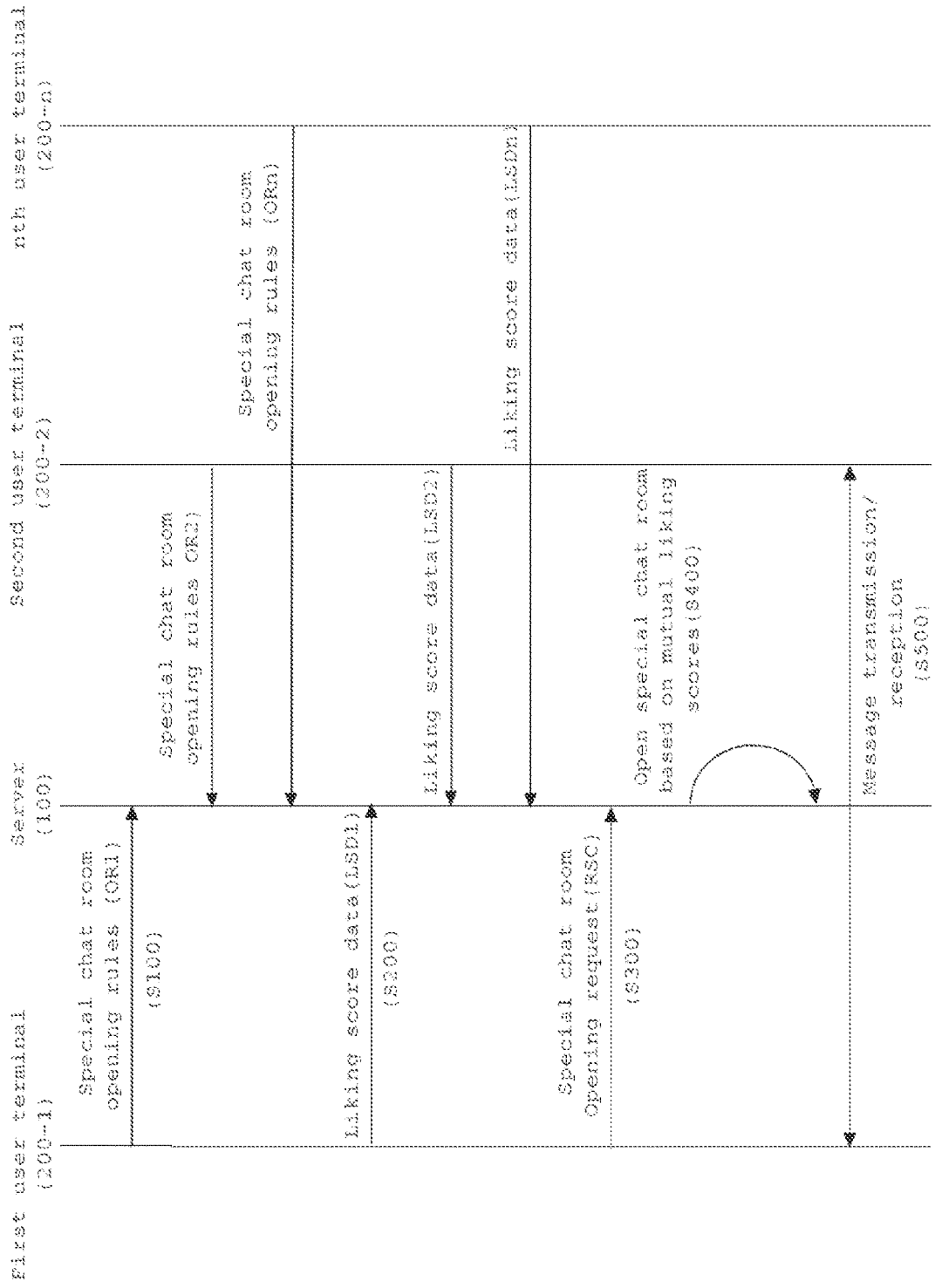
FIG. 1 shows a data flow diagram explaining a method for providing a chat service according to an embodiment of the present disclosure.

The specific structural or functional descriptions according to the concept of the present disclosure described herein are exemplary to merely describe the embodiments of the present disclosure, and the embodiments according to the concept of the present disclosure can be implemented in various forms and should not be construed as being limited to the embodiments described in the present specification.

Since various modifications can be made and diverse embodiments are applicable to the embodiments according to the concept of the present disclosure, specific embodiments will be illustrated in the drawings and described in detail. However, these specific embodiments should not be construed as limiting the embodiments according to the concept of the present disclosure but should be construed as extending to all modifications, equivalents, and substitutes within the spirit and technical scope of the present disclosure.

Terms, such as first or second, may be used to describe various elements, but the elements are not limited by these terms. The terms are used merely for the purpose of distinguishing one element from other elements. For example, a first element may be named a second element and, similarly, a second element may be named a first element without departing from the scope according to the concept of the present disclosure.

It will be understood that when an element is referred to as being "connected" or "coupled" to another element, it may be directly connected or coupled to the other element, or an intervening element may exist. In contrast, it will be understood that when an element is referred to as being "directly connected" or "directly coupled" to another element, there is no intervening element. Other expressions describing the relationships between elements, that is, "between" and "immediately between" or "neighboring" and "immediately neighboring," should be interpreted in the same manner.

The terms used in the present specification are used to describe only specific embodiments and are not intended to limit the present disclosure. Singular forms are intended to include plural forms unless the context clearly indicates otherwise. It will be further understood that the terms "include," "have," or the like used herein specify the presence of stated features, numerals, steps, operations, elements, parts, or a combination thereof but do not preclude the probability of presence or addition of one or more other features, numerals, steps, operations, elements, parts, or combinations thereof.

Unless otherwise defined, all terms used herein, including technical or scientific terms, have the same meanings as terms generally understood by those of ordinary skill in the art to which the present disclosure pertains. Terms defined in a generally used dictionary are to be interpreted to have meanings consistent with the contexture meanings in the relevant field of art and are not interpreted to have ideal or excessively formal meanings unless clearly defined herein.

Hereinafter, preferred embodiments of the present disclosure will be described in detail with reference to the accompanying drawings.

FIG. 1 shows a data flow diagram explaining a method for providing a chat service according to an embodiment of the present disclosure.

Referring to FIG. 1, a chat service system according to an embodiment of the present disclosure may include a server 100 and a plurality of user terminals 200-1 to 200-n.

The server 100 may provide a chat service among the plurality of user terminals 200-1 to 200-n.

The server 100 may open a special chat room between the plurality of user terminals 200-1 to 200-n, more specifically, between two terminals among the plurality of user terminals 200-1 to 200-n, according to a request of at least one of the plurality of user terminals 200-1 to 200-n.

The server 100 may receive special chat room opening rules OR1 to ORn set by each of users from the plurality of user terminals 200-1 to 200-n and store the special chat room opening rules OR1 to ORn in a database (not shown) (S100).

According to an embodiment, the chat room opening rules OR1 to ORn may be either self-oriented rules or other-oriented rules.

Herein, the "self-oriented rules" means that when summed scores of mutual liking scores are the same, a counterpart of a special chat room is selected according to liking scores assigned to the counterpart by a user.

Conversely, the "other-oriented rules" means that when summed scores of mutual liking scores are the same, a counterpart of a special chat room is selected according to liking scores assigned to the user by the counterpart.

The server 100 may require the users to input the special chat room opening rules OR1 to ORn when registering as members.

At this time, the server 100 may request to select and input the special chat room opening rules OR1 to ORn, or set the special chat room opening rules OR1 to ORn for the users by identifying the users' propensities through at least one questionnaire.

The server 100 may receive, from the plurality of user terminals 200-1 to 200-n, liking score data LSD1 composed of liking scores that each of the users has assigned to other users and store the liking score data LSD1 in a database (not shown) (S200).

Depending on embodiments, the server 100 may request, through the plurality of user terminals 200-1 to 200-n, each of the users to assign liking scores to other users at the time of membership registration or before a special chat room opening request.

For example, the server 100 may request each of the users to input liking scores for other users as numerical scores.

As another example, the server 100 may request each of the users to input liking scores for other users as a grade indicated by number of hearts.

As still another example, the server 100 may request to input liking scores for a plurality of classified items such as appearance, personality, hobbies or the like.

Then, when a special chat room opening request RSC is received from any one of the plurality of user terminals 200-1 to 200-n, for example, from a first user terminal 200-1, the server 100 may open a special chat room based on the liking scores between users stored in the database (not shown) (S400).

A process of opening a special chat room by the server 100 will be explained in more detail with reference to FIG. 2.

Figure 2:
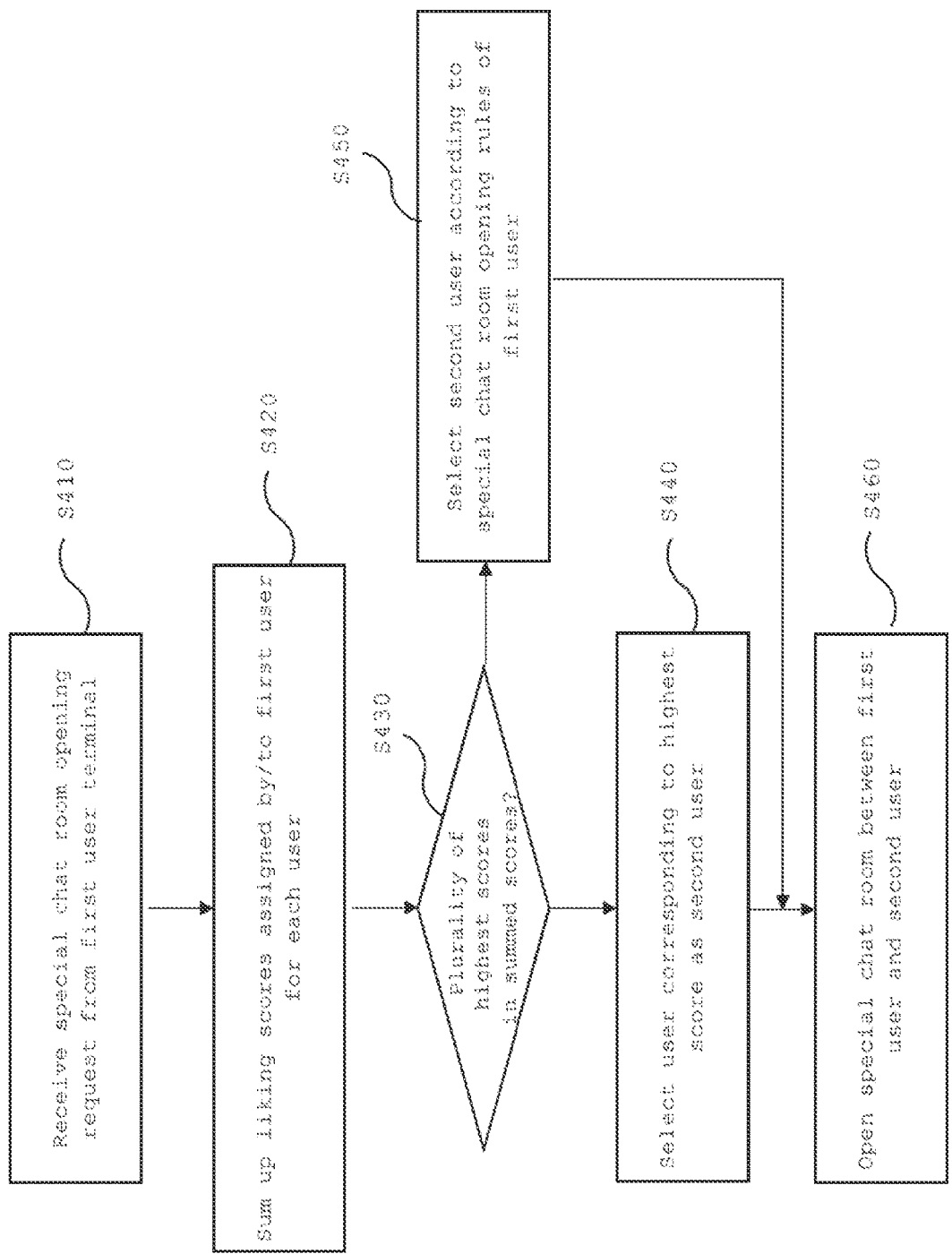
FIG. 2 shows a flow chart for explaining steps for opening a special chat room by a server shown in FIG. 1.

FIG. 2 shows a flow chart for explaining a process for opening a special chat room by the server shown in FIG. 1.

In FIG. 2, it is assumed that a special chat room opening request is received from the first user terminal 200-1 of a first user.

Referring to FIG. 2, when receiving a special chat room opening request RSC from the first user terminal 200-1, the server 100 may start a special chat room opening process (S410).

The server 100 may calculate summed scores for each of the users by summing up the liking scores assigned to other users by the first user and liking scores assigned to the first user by the other users (S420).

The server 100 may compare summed scores of each user and select a user corresponding to the highest score as a second user. Herein, since there may be multiple users corresponding to the highest score, the server 100 may perform an additional process to open only one special chat room.

Specifically, the server 100 may compare summed scores for each user and determine whether there are multiple users corresponding to the highest score (S430).

When a single user corresponds to the highest score (branch "No" of S430), the server 100 may select the user corresponding to the highest score as a second user (S440).

On the other hand, if a user corresponding to the highest score does not exist, the server stores and holds the liking information sent by the first user.

When there are multiple users corresponding to the highest score (branch "Yes" of S430), the server 100 may select a user selected according to the special chat room opening rules OR1 of the first user as a second user among the users corresponding to the highest score (S450).

Figure 3:
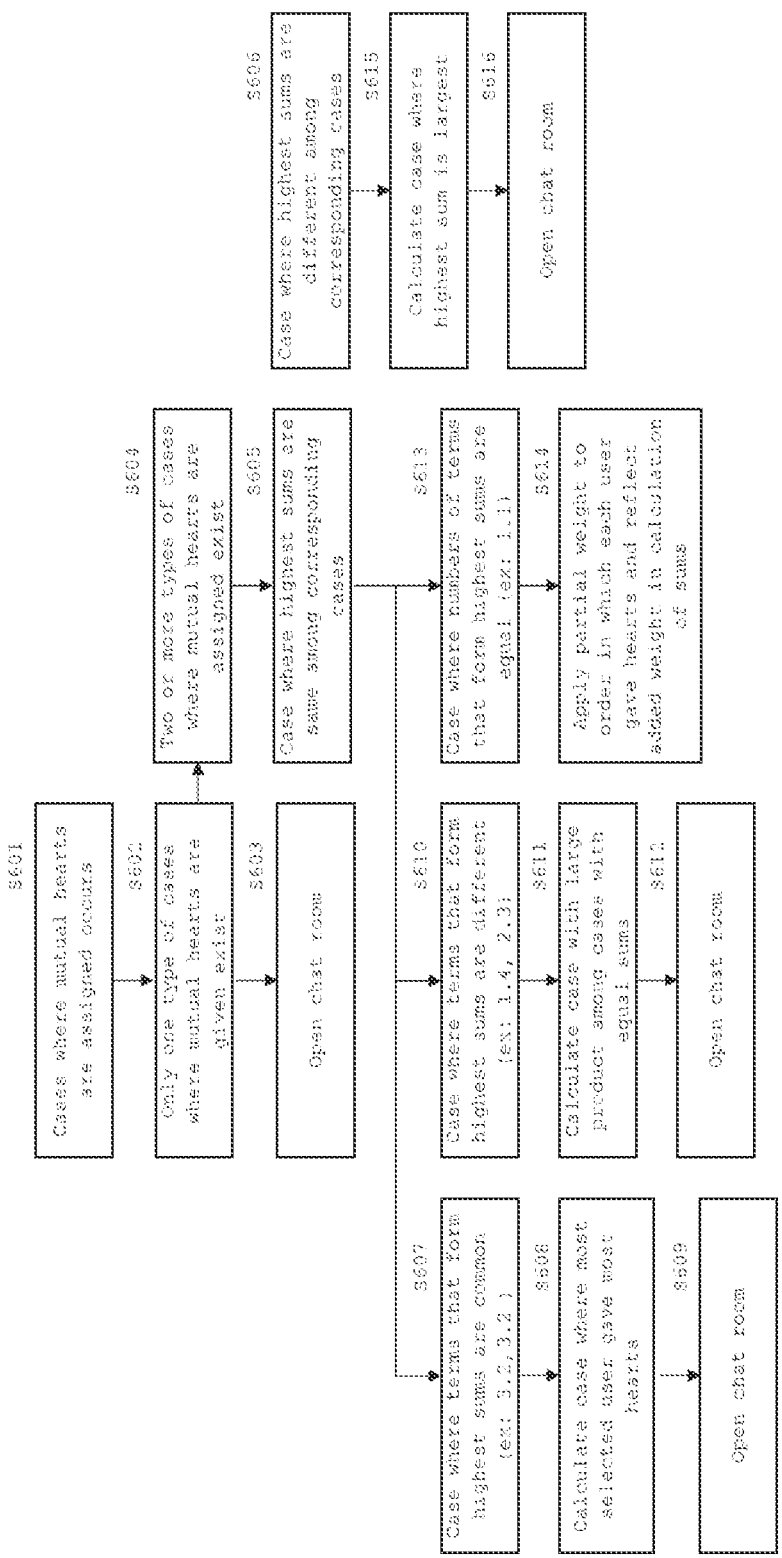
FIG. 3 and FIG. 4 show flow charts for explaining a process for opening a special chat room by using hearts.

The contents of the first user's special chat room opening rule OR1 are the contents of FIG. 3.

Herein, when multiple users are still selected according to the special chat room opening rules OR1 of the first user, the server 100 may assign the first user an opportunity to select a chatting partner.

For example, as shown in the following table, assuming that four users assign each other liking scores and user A makes a special chat room opening request, the summed scores of user B and user D are the same, resulting in the highest score (7 points).

TABLE 1

| from | to |   |   |   |
|---|---|---|---|---|
|      | A | B | C | D |
| A    |   | 4 | 2 | 3 |
| B    | 3 |   | 2 | 3 |
| C    | 2 | 4 |   | 3 |
| D    | 4 | 2 | 4 |   |

At this time, if user A has set self-oriented rules, the server 100 selects user B as the second user because the second user is selected according to the liking score assigned by the user A.

Conversely, if user A has set other-oriented rules, the server 100 selects user D as the second user because the second user is selected according to the liking score assigned by the other party.

When the second user is selected, the server 100 may open a special chat room between the first user and the second user (S460).

In other words, the server 100 may open a special chat room between the first user terminal 200-1 and a second user terminal 200-2.

Herein, the special chat room means a chat room, to which only permitted users can access and which can open only one per user.

That is, in order for a user to open another special chat room, a special chat room in which the user and a chat partner are currently participating must be extinguished by the user or chat partner leaving the special chat room.

To this end, when selecting a second user, the server 100 may exclude users using a special chat room from a second user candidate group.

As described above, the server 100 provides a chat service so that users can open a special chat room according to mutual-liking between acquaintances.

By opening a special chat room without exposing, to other uses, liking expressions sent by the first user to the plurality of users 200-n, users can feel free to express their liking for other users.

Figure 4:
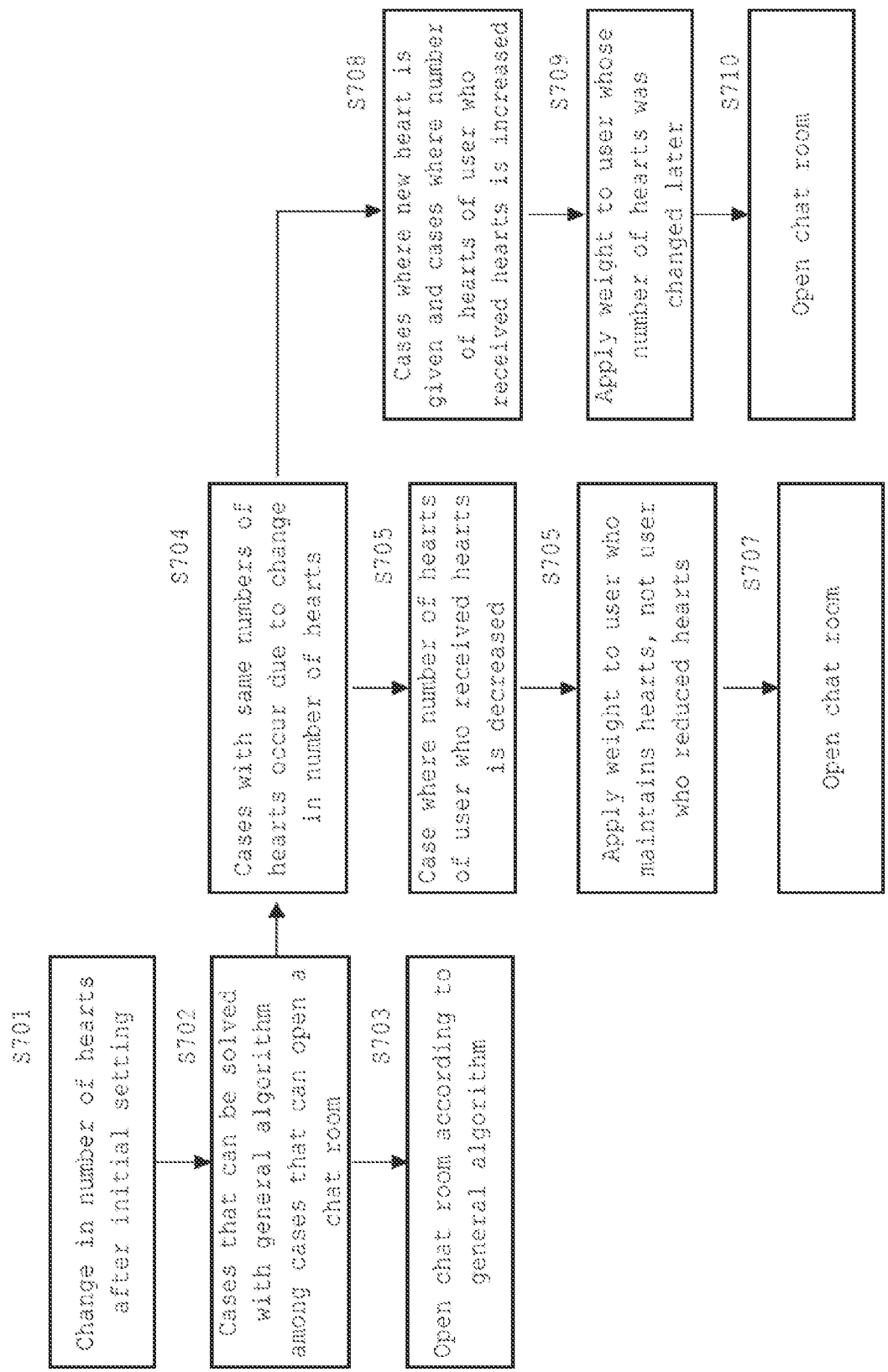

FIG. 3 and FIG. 4 show flow charts for explaining steps for opening a special chat room by using hearts. Specifically, FIG. 3 shows a processing flow chart for explaining cases where mutual hearts are given, and FIG. 4 shows a processing flow chart for cases where previously set number of hearts are changed.

First, cases where mutual hearts are given as shown in FIG. 3 will be described.

Referring to FIG. 3, when a case where mutual hearts are given occurs (S601), the server 100 determines whether there is only one type of cases where mutual hearts are given between specific users. If it is determined that only one type exists (S602), the server 100 opens a special chat room between the specific users (S603).

Meanwhile, if the server 100 determines that there are two or more types of cases where mutual hearts are given between users (S604), then the server 100 controls whether to open a special chat room by classifying the cases into a case where highest sums of the mutual hearts given between corresponding users are the same and a case where the highest sums are different (S605-S606).

First, in the case where highest sums of mutual hearts given between users are the same, opening of a special chat room is controlled considering three cases again. That is, in the case where highest sums of mutual hearts are the same, the cases may be classified into a case where terms that form largest sums are common, a case where the terms that form the largest sums are different, and a case where the terms that form the largest sums are equal to each other.

In the case where the terms that form the largest sums are common (S607), as an example, a case where a user who was selected most gave most hearts is calculated (S608). For example, in a case where three and two mutual hearts were respectively given between user A and user B, and three and two mutual hearts were respectively given between user B and user C, a special chat room is opened for user B, who was selected most, and user C, who received hearts from the most selected user B (S609). Conceptualizing this, when (A, B)=(3, 2) and (B, C)=(3, 2), it may be defined that user B opens a special chat room with user C. In this way, each term can be defined as a set consisting of number of hearts received by a corresponding user.

In addition, in the case where the terms that form the largest sums are different (S610), as an example, a case where a product is large is calculated among the cases where the sums are equal (S611). For example, when (A, B)=(1, 4) and (B, C)=(2, 3), user B opens a special chat room with user C (S612).

Furthermore, in the case where the terms that form the largest sums are equal to each other (S613), a weight is given to the order in which each user gave hearts so that the weight is reflected in the calculation of sums (S614). For example, when (A, B)=(1, 1) and (B, C)=(1, 1), if user B gave a heart to user A first, then user B opens a special chat room with user A.

Meanwhile, if the highest sums of mutual hearts given between users are different, the largest sum is calculated (S615) and a special chat room is opened (S616).

Subsequently, "cases where previously set number of hearts are changed" in FIG. 4 will be described.

Referring to FIG. 4, if numbers of hearts change after initial setting of users (S701), for example, the server 100 opens a special chat room according to a corresponding algorithm (S703) in a case where it is possible to solve the change with the corresponding algorithm among the cases in which a special chat room can be opened as shown in FIG. 3 (S702).

Meanwhile, if the server 100 determines that it is not possible to solve the change with the corresponding algorithm among the cases in which a special chat room can be opened as presented in FIG. 3, then it is determined whether cases with same numbers of hearts occur due to the change in number of mutual hearts (S704).

First, if cases with same numbers of hearts occur due to changes in number of mutual hearts, opening of a special chat room is controlled considering three cases again. That is, in the cases where numbers of hearts are equal due to changes in number of mutual hearts, the cases may be classified into a case where number of hearts is decreased than before, a case where number of hearts is increased than before, and a case where a new heart is given.

In the case where the number of hearts is decreased than before (S705), a weight is applied to a user who maintains hearts, not a user who reduced hearts (S706). For example, when (A, B) was changed from (1, 5) to (1, 4) and (B, C)=(4, 1), user B opens a special chat room with user C (S707).

Meanwhile, in the cases where the number of hearts is increased than before and where a new heart is given (S708), a weight is applied to a user whose number of hearts was changed later (S709). For example, when (A, B) was changed from (1, 3) to (1, 4) and (B, C)=(4, 1), user B opens a special chat room with user A (S710).

Even though the present disclosure has been described with reference to one embodiment illustrated in the drawings, the above-described embodiment is illustrative only and it would be understood by those skilled in the art that various changes and equivalent other embodiments can be made. Therefore, the true technical protection scope of the present disclosure should be defined by the technical spirit of the appended claims.

What is claimed is:

1. A method for providing a mutual-liking-based chat service, comprising the steps of:
   receiving a liking score for each of a plurality of users provided by one or more of the plurality of users to form a pair of mutual liking scores for every pair of the users, each of the pairs comprising a first value and a second value, wherein the liking scores are composed of grades indicated by number of hearts;
   identifying two or more pairs corresponding to the users who have received and given the liking scores to each of two or more of the users, among the plurality of users;
   shortlisting three or more users corresponding to the pairs, among the identified pairs, wherein sum of the first value and the second value of each of the pairs of the shortlisted users are equal and highest among the identified users;
   opening a special chat room between a first user and a second user among the shortlisted users, wherein,
      the first user has received highest liking score among the shortlisted users from the shortlisted users, and the second user has received highest liking score from the first user among the shortlisted users, when the first value and the second value of each of the pairs of shortlisted users are same as the first value and the second value of each of the remaining pairs of shortlisted users;
      product of the pair that represent the mutual liking score between the first user and the second user is highest among product of each of the remaining pairs of the shortlisted users, when the first value and the second value of each of the pairs of shortlisted users are different from the first value and the second value of each of the remaining pairs of shortlisted users; or
      the first user and the second user are selected for the special chat room at least based on order in which the shortlisted users provided liking score to one or more of the users among the shortlisted users, when the first value is same as the second value in each of the pairs of shortlisted users.

2. Method for providing a mutual-liking-based chat service, comprising the steps of:
   receiving a liking score for each of a plurality of users provided by one or more of the plurality of users to form a pair of mutual liking scores for every pair of the users, each of the pairs comprising a first value and a second value, wherein the liking scores are composed of grades indicated by number of hearts;
   identifying two or more pairs corresponding to users who have received and given the liking scores to each of two or more of the users, among the plurality of users;
   shortlisting three or more users corresponding to the pairs, among the identified pairs, wherein sum of the first value and the second value of each of the pairs of the shortlisted users are equal and highest among the identified users, and the first value and the second value of each of the pairs of shortlisted users are same as the first value and the second value of each of the remaining pairs of shortlisted users;
   opening a special chat room between a first user and a second user among the shortlisted users, wherein, the first user has received highest liking score among the shortlisted users from the shortlisted users, and the second user has received highest liking score from the first user among the shortlisted users.

3. A method for providing a mutual-liking-based chat service, comprising the steps of:
   receiving a liking score for each of a plurality of users provided by one or more of the plurality of users to form a pair of mutual liking scores for every pair of the users, each of the pairs comprising a first value and a second value, wherein the liking scores are composed of grades indicated by number of hearts;
   identifying two or more pairs corresponding to users who have received and given the liking scores to each of two or more of the users, among the plurality of users;
   shortlisting three or more users corresponding to the pairs, among the identified pairs, wherein sum of the first value and the second value of each of the pairs of the shortlisted users are equal and highest among the identified users, and the first value and the second value of each of the pairs of shortlisted users are different from the first value and the second value of each of the remaining pairs of the shortlisted users;

opening a special chat room between a first user and a second user among the shortlisted users, wherein, product of the pair that represent the mutual liking score between the first user and the second user is highest among product of each of the remaining pairs of the shortlisted users.

* * * * *